UNITED STATES PATENT OFFICE.

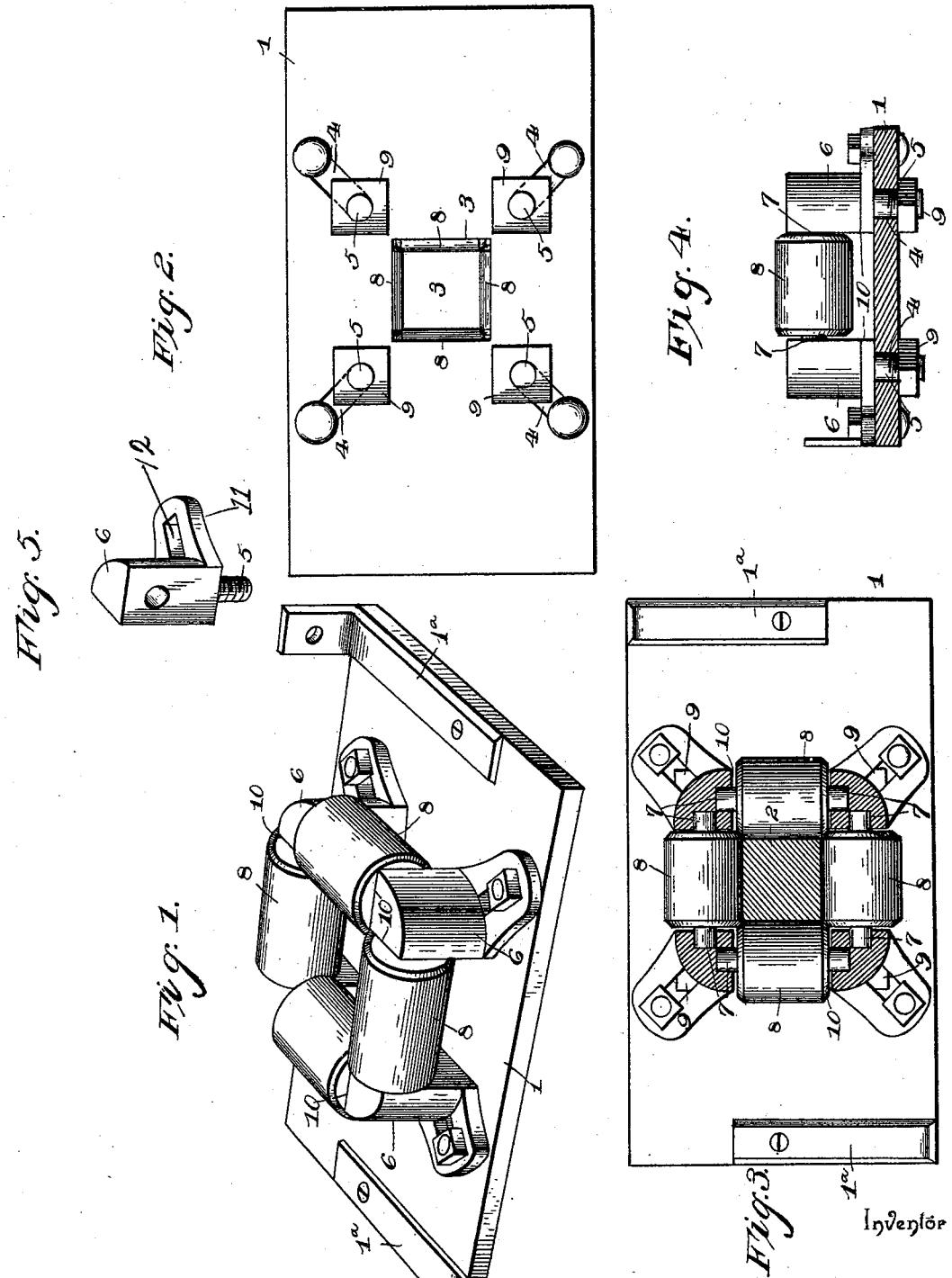

ARNE S. TRAGETHON, OF KENSETT, IOWA.

BRACE AND GUIDE FOR WINDMILL PUMP-RODS.

SPECIFICATION forming part of Letters Patent No. 519,514, dated May 8, 1894.

Application filed August 22, 1893. Serial No. 483,743. (No model.)

*To all whom it may concern:*

Be it known that I, ARNE S. TRAGETHON, a citizen of the United States, residing at Kensett, in the county of Worth and State of Iowa, have invented a new and useful Brace and Guide for Windmill Pump-Rods, of which the following is a specification.

The invention relates to improvements in braces and guides for wind mill pump rods.

The object of the present invention is to provide a frictionless guide and brace for pump rods of wind mills, which guide and brace will be simple and inexpensive in construction, and capable of preventing wear of the parts to any appreciable extent, and adapted to support and hold the pump rod of a wind mill steady.

A further object of the invention is to enable the guide and brace to be readily adjusted to a pump rod.

The invention consists in the construction and novel combination and arrangement of parts hereinafter fully described, illustrated in the accompanying drawings and pointed out in the claims hereto appended.

In the drawings—Figure 1 is a perspective view of a guide and brace for wind mill pump rods embodying the invention. Fig. 2 is a reverse plan view of the same. Fig. 3 is a horizontal sectional view showing a pump rod in position in the guide and brace. Fig. 4 is a vertical sectional view showing the manner of adjusting the bearings. Fig. 5 is a detail perspective view of one of the adjustable bearings.

Like numerals of reference indicate corresponding parts in all the figures of the drawings.

1 designates a base plate or support, which may be constructed of any suitable material, and which may be extended across a wind mill tower (not shown) or be secured centrally therein for guiding and supporting a wind mill pump rod 2. The base plate or support 1 is provided with a central rectangular opening 3, and has beyond the opening at the corners thereof slots 4, which are disposed diagonally with relation to the opening, and which receives shanks 5 of adjustable bearings 6. The bearings have openings or sockets in their inner and adjacent faces to receive journals 7 of anti-friction rollers 8 and the bearing faces which have the openings or sockets are arranged at right angles to each other. The anti-friction rollers 8 are adapted to bear against the pump rod 2 at four sides thereof to steady and support the pump rod and they are capable of inward and outward adjustment in order to bear properly against the pump rod. The shanks 5 depend below the base plate or support and are threaded, and are engaged by nuts 9 for securing the bearings at the desired adjustment. The bearings 6 are provided with straight inner sides 10, which have the bearing openings or sockets, and they are substantially triangular in horizontal section, and they serve to fit in the corners or spaces at the ends of the rollers. Each adjustable bearing is provided at its outer side with a diagonally arranged attachment plate 11, which is arranged on the upper face of the base plate or support 1, and is provided with a slot 12 registering with the adjacent slot 4 of the base plate or support and receiving a bolt 13. The bolt 13 passes through both of said slots and has its nut 14 arranged on the upper face of the plate 11. By arranging the securing nuts of each bearing above and below as shown the parts are firmly held in place. The base plate or support 1 may be provided with knees 1ª to assist in securing it to a wind mill tower.

It will be readily apparent that the guard, brace and guide is simple and comparatively inexpensive in construction, that it forms a frictionless bearing and support for a pump rod, and that it may be readily adjusted to the same.

Changes in the form, proportion and the minor details of construction may be resorted to without departing from the principle or sacrificing any of the advantages of this invention.

What I claim is—

1. A guide and brace for pump rods comprising a flat, horizontally disposed support having a central pump rod opening, the horizontally disposed rollers provided at their ends with journals and arranged in a rectangular form around the opening and projecting inward over the same to bear against a pump rod, the diagonally adjustable bearings arranged between the adjacent ends of the rollers and having vertical bearing faces arranged at right angles to each other and provided with openings receiving the journals of the rollers, and means for fastening the bearings to the support, substantially as described.

2. A guide and brace for pump rods, comprising a support having an opening to receive a pump rod and provided beyond the same with diagonally disposed slots, bearings mounted on the support and provided in their inner adjacent faces with bearing openings and having depending shanks arranged in the slots of the support, rollers arranged between the bearings and having journals fitted in the same, and means for securing the shanks of the bearings at the desired adjustment, substantially as described.

3. A guide and brace for pumps, comprising a support having a pump rod opening and provided beyond the same with diagonally-disposed slots, bearings mounted on the support and having bearing openings and provided with depending shanks secured in the slots of the support, said bearings being provided with outward extending slotted attachment plates arranged on the upper face of the support and having their slots registering with those of the support, the rollers mounted in the bearings, and bolts passing through the slots of the support and the attachment plates, substantially as described.

In testimony that I claim the foregoing as my own I have hereto affixed my signature in the presence of two witnesses.

ARNE S. TRAGETHON.

Witnesses:
N. E. HAUGEN,
A. H. BJORGO.